Aug. 11, 1925.
F. J. WILSON
1,549,039
RIM AND WHEEL LOCK
Filed Feb. 14, 1924
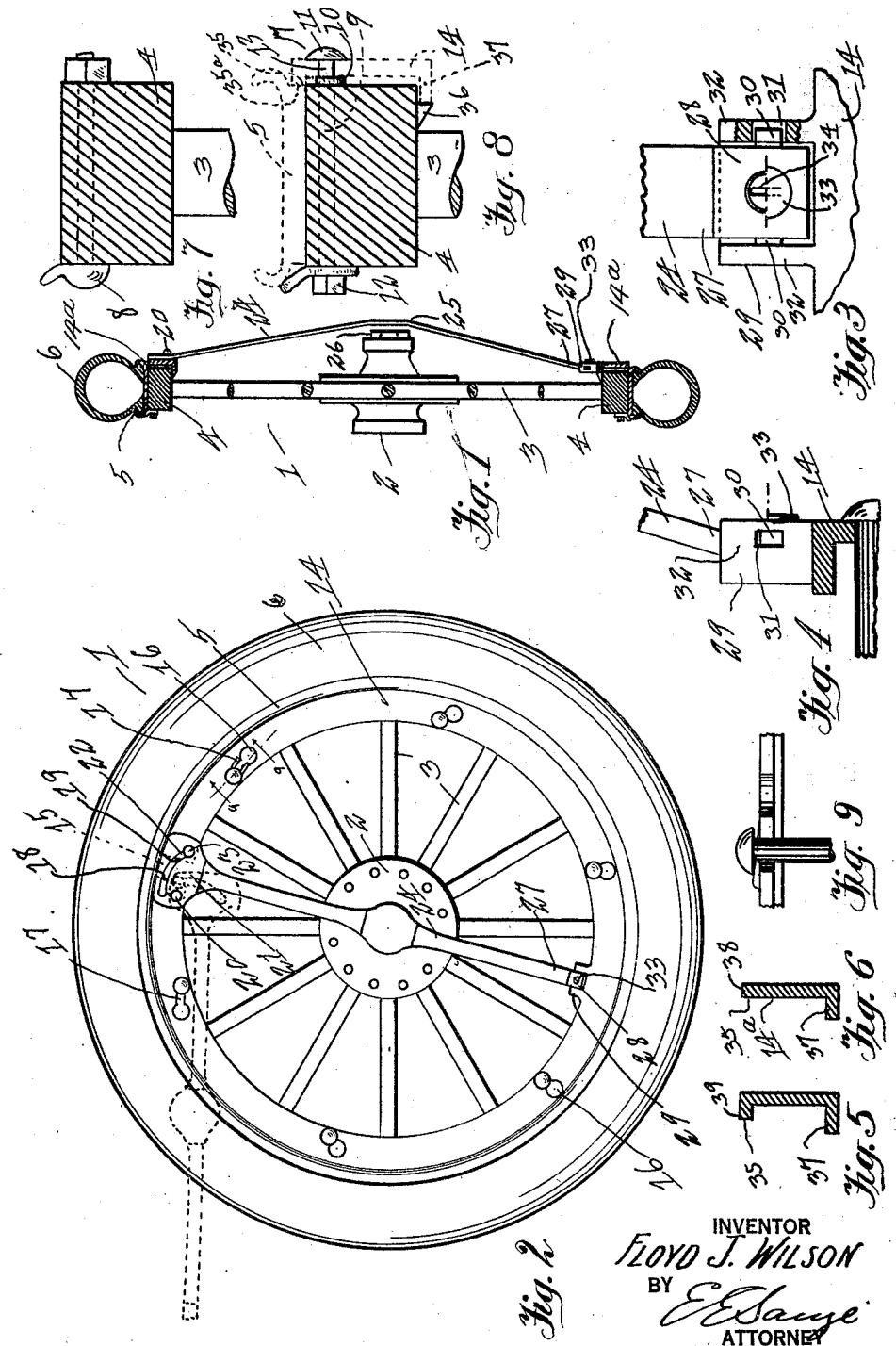
INVENTOR
FLOYD J. WILSON
BY
ATTORNEY Patented Aug. 11, 1925.

1,549,039

UNITED STATES PATENT OFFICE.

FLOYD J. WILSON, OF WALLA WALLA, WASHINGTON.

RIM AND WHEEL LOCK.

Application filed February 14, 1924. Serial No. 692,626.

*To all whom it may concern:*

Be it known that I, FLOYD J. WILSON, a citizen of the United States, residing at Walla Walla, in the county of Walla Walla and State of Washington, have invented certain new and useful Improvements in Rim and Wheel Locks, of which the following is a specification.

This invention relates to combined rim and wheel locks and has as one of its objects to provide a means for locking a rim on a wheel, and also locking the wheel against unlawful removal.

Another object of the invention is to provide a means for locking rims on a wheel that includes a lever of sufficient relative length whereby considerable force may be applied and the rim firmly secured, and utilizing the lever for the additional purpose of preventing the removal of the hub cap, thus maintaining the wheel secure.

A further object of the invention is to provide a means for locking the rim and wheel that requires no other means for removal except a key.

A further object of the invention is to provide a means for locking a rim and wheel that is simple to construct and that is highly efficient in operation.

With these and other objects in view reference is now had to the accompanying drawings in which—

Fig. 1 is a side elevation of the device, partly in section;

Fig. 2 is a front elevation of the device showing its application;

Fig. 3 is an enlarged front elevation of the fastening lock and socket;

Fig. 4 is an enlarged side elevation of the socket;

Fig. 5 is a cross section of one form of ring;

Fig. 6 is a cross section of another form of ring;

Fig. 7 shows a standard lug bolt in place;

Fig. 8 shows my modified form of lug bolt; and

Fig. 9 is a sectional view, showing a wedge, on the line 9—9 of Fig. 2.

Having reference to the drawings like numerals refer to like parts throughout the several views and the numeral 1 refers to an automobile wheel comprising a hub 2, spokes 3 and a felly 4. Slidably mounted on the felly is a rim 5 which carries a tire 6 in the usual manner.

Lug bolts 7, of a slightly different form than the regular lug bolt 8, are used and consist preferably of a shank 9 having a solid collar 10 that maintains the head 11 away from the felly when the nut 12 is drawn tight, and so positioned on the bolt to provide a space 13 wherein a ring 14 will be mounted for operation.

The ring 14 is of spring material and is split, as at 15, so that it may be yieldingly expanded or contracted in a manner to be presently explained.

The ring is provided with apertures 16 of a size to freely receive the head 11 of the lug bolt 7, and a slot 17 of a size to receive the shank 9 of the bolt extends from the aperture in a direction toward the split 15. By this means the ring may be slidably and demountably mounted on the lug bolts in a manner to permit of expanding or contracting the ring by means of a cam acting locking means which will now be explained:

By splitting the ring obviously two ends 18 and 19 respectively, are formed and one of the ends 18 carries a rivet 20 on which will be pivotally and rotatably mounted the locking means which in turn consists of a head 21, provided with a cam slot 22 that engages a rivet 23 firmly fixed in the other end 19 of the ring.

As the ring is positioned vertically this means of mounting the head provides for rotating the head in a vertical plane. By noting the position of the dotted representation of the elongated handle 24, this position being assumed when the ring is contracted, the advisability of so rotating the handle will become apparent as the handle is provided with an outward curve 25 to avoid the hub cap 26, and the curved portion will conveniently allow for the projecting sides of the tire 6 when the handle is rotated to its extreme position, the free end 27 yielding sufficient to pass the tire as it is rotated.

The handle is provided on its free end with a lock 28 and at a point on the ring opposite the ends 18 and 19 is a socket 29, which is preferably made a part of the ring, and into which the lock will seat when the ring is brought to the expanded position.

The lock is provided preferably with a pair of bolts 30 which engage recesses 31 in the wings 32 of the socket and a cap 33 is placed over the key hole 34, and being secured there in any suitable manner prevents the dust and mud entering to the detriment of the easy action of the lock. The cap is shown, in Fig. 3, partly cut away to disclose the key hole.

In use the tire and rim are placed over the elongated handle and onto the wheel, the handle is then brought to the diametral line thus moving the head, and with it the cam slot over the rivet 23, thereby expanding the ring by forcing the ends apart, when this movement will in turn force the inner edge 35 of the ring against the rim where it holds it securely in place.

The free end of the handle is then brought into engagement with the socket and locked by means of a key in the usual manner.

The ring may be of channel section as shown at 14 in Fig. 5, or may be of angle section as shown at 14ª in Fig. 6, both depending on whether the rim is plain, as shown in Fig. 1, or whether it carries a shoulder 35ª as shown dotted in Fig. 8. In both cases a lug 36 may be attached to the felly to be engaged by the lower leg 37 of the ring, and the outer edge 38 may be straight as shown in Fig. 6, or may be bent over, as at 39, to engage the shoulder 35 of the rim as the shape of the particular rim may require.

Wedges 40, as shown in Fig. 9, may be attached to the ring wherewith to force it more tightly against the rim as the ring is expanded.

Having thus described my invention, I claim—

1. In a rim and wheel lock, a yielding split ring slidably and demountably mounted on the lug bolts of a wheel, a cam acting locking means operably attached to the ends of said ring, and having a handle extended over the hub cap of said wheel to a point diametrally opposite the said ends, and a means for locking said handle at said point.

2. In a rim and wheel lock, the combination of a yielding split ring slidably and demountably mounted on the lug bolts of a wheel, and means rotatably mounted on the ring for expanding said ring against the rim, said means having an elongated handle extended and curved over the hub cap of said wheel, to a point on the ring diametrally opposite the ends of said ring, and means for locking the handle to the ring at said point.

3. In a rim and wheel lock, a yielding split ring slidably and demountably mounted on the lug bolts of the wheel, a cam acting locking means pivotally attached to said ends and rotatable about the pivot in a vertical plane, an elongated handle forming a part of said locking means, said handle being extended and curved over the hub cap of said wheel, a socket on said ring, and a lock on the free end of said handle for lockably engaging said socket.

In testimony whereof I affix my signature.

FLOYD J. WILSON.